Nov. 26, 1963             L. PÉRAS           3,112,418
DEVICES FOR GRADUALLY ESTABLISHING AN ELECTRIC
CURRENT, NOTABLY FOR CONTROLLING
ELECTROMAGNETIC CLUTCHES

Filed June 15, 1959           3 Sheets-Sheet 1

Inventor
Lucien Péras
By Stevens Davis Miller & Mosher
Attorneys

Nov. 26, 1963   L. PÉRAS   3,112,418
DEVICES FOR GRADUALLY ESTABLISHING AN ELECTRIC
CURRENT, NOTABLY FOR CONTROLLING
ELECTROMAGNETIC CLUTCHES
Filed June 15, 1959   3 Sheets-Sheet 2

Inventor
Lucien Péras
By Stevens Davis Miller & Mosher
Attorneys

Nov. 26, 1963  L. PÉRAS  3,112,418
DEVICES FOR GRADUALLY ESTABLISHING AN ELECTRIC
CURRENT, NOTABLY FOR CONTROLLING
ELECTROMAGNETIC CLUTCHES
Filed June 15, 1959  3 Sheets-Sheet 3
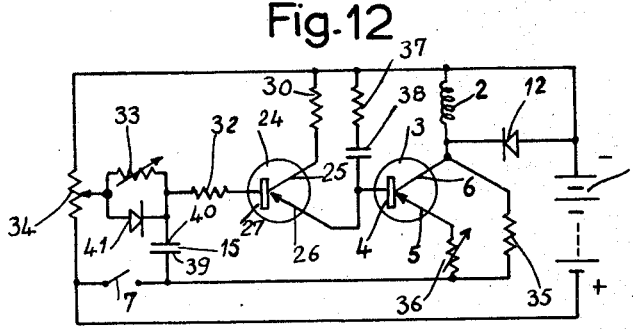
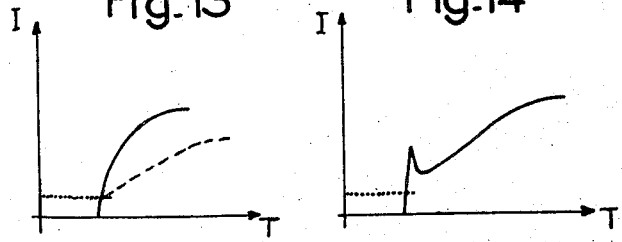
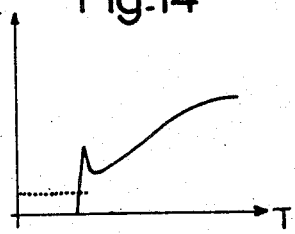
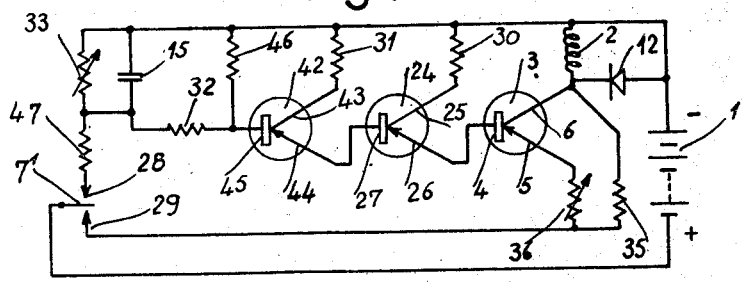
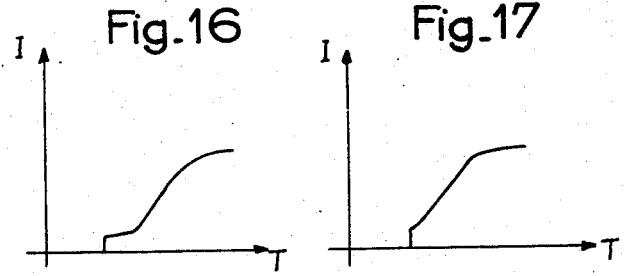
Inventor
Lucien Péras
Attorneys

United States Patent Office 3,112,418
Patented Nov. 26, 1963

3,112,418
DEVICES FOR GRADUALLY ESTABLISHING AN ELECTRIC CURRENT, NOTABLY FOR CONTROLLING ELECTROMAGNETIC CLUTCHES
Lucien Péras, Billancourt, France, assignor to Regie Nationale des Usines Renault, Billancourt, France
Filed June 15, 1959, Ser. No. 820,462
Claims priority, application France June 20, 1958
5 Claims. (Cl. 310—95)

In certain electrical devices characterized by an intermittent operation, it is advantageous that the strength of the current flowing through the device increase gradually, from the time the voltage is applied thereto, from zero value to its rated strength in accordance with a predetermined law as a function of time, whilst the current cut-off may take place without any specific care, the current strength dropping rapidly from its rated value to zero.

Moreover, the law whereby the current strength increases as a function of time cannot remain constantly the same and it may be necessary to alter it as a function of certain factors.

This is notably the case of electromagnetic clutches which are designed for coupling as smoothly as possible shafts rotating at different speeds, so as to provide between the two shafts firstly a relatively low coupling torque increasing gradually until their rotational speeds are definitely equal.

Clutches of this general character are becoming increasingly popular in automotive vehicle transmissions and serve the purpose of either rotatably coupling two rotary members or holding one member against rotation in relation to a fixed case or like structure. In applications of this type the law governing the increase in the current strength as a function of time which is necessary for ensuring a satisfactory gradual engagement of the clutch should not be the same, for example whether the engine is accelerated very rapidly (in which case the clutch action must be relatively quick to prevent the engine-driven member from accelerating its rotation up to unduly high speeds) or the engine is not accelerated or is moderately accelerated (in which case the clutch action must be preferably slower in order to provide an engagement as smooth as possible).

Devices adapted to control the establishment of current according to this type of law are already known which operate by inserting in the clutch circuit or in general in the load circuit a variable resistance in the form of a rheostat the slider of which is displaced mechanically according to a predetermined law of motion from its maximum-resistance position to its minimum-resistance position. These devices incorporate movable members necessitating a certain maintenance and are subject to wear. Moreover, they are liable to produce accidental current variations owing to faulty contacts.

Now it is the object of the present invention to provide a device adapted to carry out the function set forth hereinabove, this device being characterized by a minimum number of movable parts while having reduced over-all dimensions, and also by the use of certain semi-conducting crystals incorporated in the circuit to be controlled.

A well-known form of these semi-conducting crystals or semi-conductors is designated by the generic name of transistor, and semi-conductors of this character may comprise a plurality of electrodes or junctions and be made from silicon, germanium, indium, etc. By virtue of the current or voltage amplification effected by these assemblies it is possible to cause the strong current or currents of the circuit to be controlled to vary by acting upon the low-consumption or high-impedance control circuits consisting of linear or non-linear elements such as resistors, capacitors, induction coils and, if necessary, other semi-conductors of the junction or field type.

Thus, elements characterized by relatively reduced over-all dimensions and a satisfactory efficiency will be obtained, whereas on the contrary the direct action of the load circuit and notably of an electrical clutch operating by means of correction networks without semi-conductors leads to solutions difficult to carry out on a commercial scale, not to mention the frequent cases of a permanent loss of energy.

In order to afford a clearer understanding of this invention and of the manner in which the same may be carried out in the practice, reference will now be made to the accompanying drawings forming part of this specification and illustrating diagrammatically by way of example various mountings utilizing PNP-type transistors which are the cheapest and most widely used for the time being, it being understood that NPN-type transistors may be substituted therefor, provided that the corresponding polarities are adhered to by inverting the positive and negative terminals of the source of current; besides, the use of transistors having more than three electrodes may also be contemplated, and in this case the auxiliary electrodes are supplied with current in the conventional fashion. In the drawings:

Figure 1:
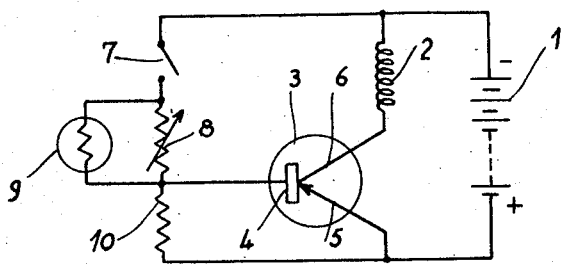
FIGURE 1 is a wiring diagram illustrating a very simple transistorized mounting based on the present invention.

FIGURES 4, 7, 9, 12 and 15 show modified forms of embodiment of the mounting of FIG. 1; and FIGURES 5, 6, 8, 10, 11, 13, 14, 16 and 17 are diagrams illustrating the current variations obtained by means of the mounting illustrated in FIGS. 4, 7, 9, 12 and 15 respectively, I being the current strength in the electromagnetic clutch control member, and T the time.

Referring to the drawings, FIG. 1 shows a very simple mounting utilizing resistors having a positive or negative temperature coefficient and undergoing a considerable temperature rise during their operation. This mounting can be used only if there is provided a current cut-off period of a duration sufficient to enable these resistors to resume a temperature approximating the ambient temperature before they are re-energized.

In this mounting, the load circuit is in the form of a coil 2 of an electrical clutch supplied with D.C. from a source 1 through the PNP-type power transistor 3 comprising a base 4, an emitter electrode 5 and a collector electrode 6. This base 4 is connected to a voltage divider consisting on the one hand of resistors 8 and 9, the former having relatively high value, and on the other hand of resistor 10. A switch 7 is provided for controlling this voltage divider, its operation controlling the presence or the absence, in the load circuit, of the current to be controlled. The resistor 10 may have a non-linear characteristic and notably a positive temperature coefficient. In certain cases, its value may be very high or even infinite. The resistor 9 is of the type having a negative temperature coefficient.

This mounting operates as follows:

The transistor 3 has such characteristics that only a very low collector current can pass therethrough when no bias is applied between its electrodes 4 and 5.

When the switch 7 is open, no current flows between the base 4 and emitter 5. Consequently, only a moderate residual current circulates in coil 2.

When it is desired to cause a gradually increasing current to flow in the load circuit by closing the switch 7, a voltage is fed intermediate the base 4 and emitter 5, but the still cold resistor 9 allows only a moderate current to flow therethrough, and resistor 8 will cause the voltage fed initially to be corrected if necessary. Consequently, a current circulates in coil 2 if the voltage fed between points 4 and 5 is sufficient to build up current in the collector electrode 6.

As resistor 9 warms up, its resistance decreases and the current flowing therethrough increases accordingly, thus incrementing the potential difference between the base 4 and emitter 5 of transistor 3. As a result, the current in coil 2 is increased and its feed voltage will attain the value of the voltage supplied by the source of current, minus the voltage drop occurring in transistor 3.

If the resistor 10 is of the non-linear type and notably of a type having a positive temperature coefficient, the law of variation in the current flowing through the coil 2 may be corrected as a function of time. Resistor 8 may be of the variable type, its characteristics being subordinate to the control factors.

Figures 2, 3:
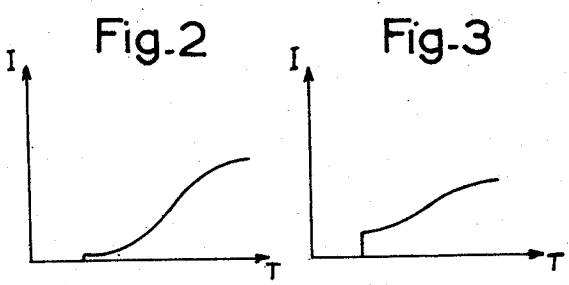
FIGURES 2 and 3 are diagrams illustrating the current variation as a function of time in the electromagnetic member controlling the clutch, at different ohmic values of a resistance in the control circuit.

Thus, curves representing the current variations in the coil 2 as a function of time are obtained, such as those illustrated in FIG. 2 for a resistor 8 having a high ohmic value, and in FIG. 3 for a resistor 8 having a medium ohmic value. The origin of these curves lies on the abscissa at a point corresponding to the moment when the switch 7 is closed.

In certain cases, it may be advantageous to have either the resistor 10 alone, or both resistors 10 and 8, variable as a function of the control factor.

Figure 4:
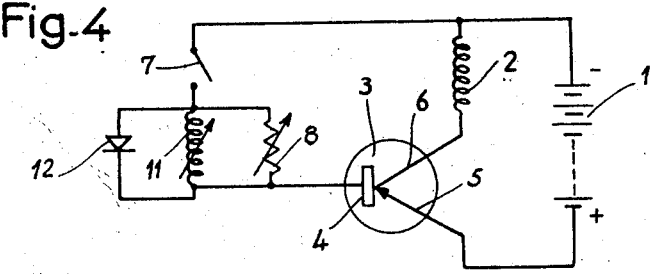

The mounting illustrated in FIG. 4, to which reference will now be made, comprises a magnetic-core induction coil 11 having a high time constant $L/R$ of the order of one second or more for controlling the establishment of current in the control circuit. The source of current 1 supplies current responsive to the action of the base 4, emitter 5 and collector 6 of the PNP transistor 3 to member 2. Connected in parallel with the variable self-induction coil 11 depending on the factors responsive to the action to be controlled are a resistor 8 (which may be variable) responsive to the same factors, and a junction diode 12 so mounted that it will not allow current to flow therethrough when the switch 7 controlling the gradual supply of current to member 2 is closed.

This arrangement operates as follows:

Closing the switch 7 for producing the gradual supply of current will cause the base 4 of transistor 3 to be connected to the negative terminal of the source of current 1 through the coil 11 counteracting the variation in the current voltage; as a result, the current flowing in base 4 increases gradually as a function of the ratio $L/R$ of coil 11 as well as of the absolute value of this resistance R and of resistance 8, the latter permitting a very rapid voltage increase up to the rated value.

Figures 5, 6:
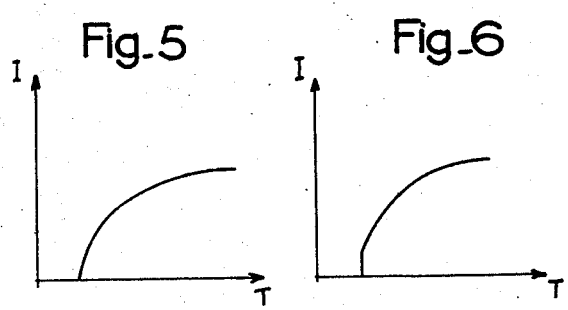

As a result, a gradual increase in the current flowing through the member 2 energized through the collector electrode 6 is obtained. Thus, the curves of FIG. 5 are obtained when the ohmic value of resistor 8 is relatively high, and those of FIG. 6 when the ohmic value of resistor 8 is relatively low. The origin of these curves lies on the abscissa at a point corresponding to the moment when switch 7 is closed.

When switch 7 is opened, the current fed to base 4 is cut off, thus causing a sudden break in the current transmitted by collector 6 to coil 2. The diode 12 protects the transistor 3 against the reverse induced current produced by the opening of switch 7.

Figure 7:
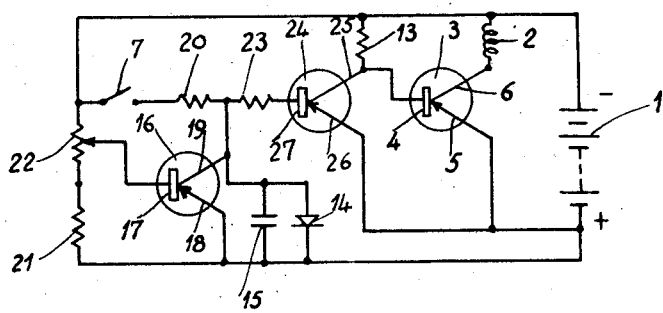

The mounting illustrated in FIG. 7 provides a curve of the current variation as a function of time which is nearly linear between a low value and a maximum value. It comprises a PNP-type transistor 3 fed with current in the same manner as that shown in FIG. 4, except that the base 4 is connected to the collector 25 of another PNP-type transistor 24 as well as to the negative terminal of the source through a resistance 13, the emitter 26 of transistor 24 being connected to the positive terminal and its base 27 being connected through a resistor 28 on the one hand to a high-capacity capacitor 15, to the collector 19 of a third PNP transistor having a high internal resistance and to a junction diode 14 providing a Zener effect, and on the other hand through a low-value resistor 20 protecting the switch 7 against overcurrents. By opening this switch 7 a gradually increasing current will appear in coil 2.

The emitter 18 of the third transistor 16 is connected to the negative terminal, the base 17 is connected to the intermediate-value potentiometer 22 connected in turn to the terminals of the source of current 1 through a resistor 21 having a negative coefficient of temperature providing the necessary compensation for the ambient temperature on the base 17 of transistor 16.

The operation of this mounting will now be described, it being assumed that switch 7 is closed, that is, in the position corresponding to the clutch disengagement in the case of an electrical clutch; at this time, a substantial potential difference limited by the Zener diode 14 is fed through resistors 20 (of very low value) and 23 between the base 27 and the emitter 26 of transistor 24 so that the latter will accept a very high current in its collector 25. The voltage drop in resistor 13 is such that the voltage fed between the base 4 and emitter 5 of the power transistor 3 is very moderate, so that the collector 6 of this transistor 3 will allow only a very moderate current to flow through coil 2 which is not sufficient to cause the operation of the member controlled thereby. The capacitor 15 is charged through resistor 20 up to a voltage limited by the Zener diode 14.

When the switch 7 is opened in order to cause a gradually increasing current to be established in the load circuit, the capacitor 15 is discharged gradually on the one hand through the resistor 23 having as high a value as possible into the base circuit of transistor 24, and on the other hand into the collector circuit 19 of the transistor 16 having a high internal resistance, this second discharge being preferably more important than the former, if a proper linearity is desired. As the potential applied to the base 17 is determined by the potentiometer 22 responsive to the control factor, the current circulating in the collector 19 will be constant within wide limits of the voltage fed to this collector, due to the specific current/voltage characteristic of this collector which is nearly horizontal, thus ensuring a substantially linear discharge, as a function of time, of capacitor 15. As the potential applied between the base 27 and emitter 26 of transistor 24 decreases gradually, the current in collector 25 will decrease as well as the value of the voltage drop in resistor 13. Thus, the potential applied between 4 and 5 will increase as well as the current in collector 6 of transistor 3, which flows through the coil 2.

Under these conditions, when the operator causes the switch 7 to be opened a gradually increasing current will appear in the member 2 and this current increase will be closed to a linear law between two limits, due to the discharge characteristic of capacitor 15 into transistor 16. If the potential fed to capacitor 15 at the time the switch 7 is closed is sufficient (to provide a clutch disengagement in the case of an electrical clutch) a certain dead time will occur when opening this switch 7, before the current is actually present, due to the saturation of the transistors which is caused by the provision of resistors connected in series with the electrodes, this dead time being used to advantage in the mounting of FIG. 15.

Figure 8:
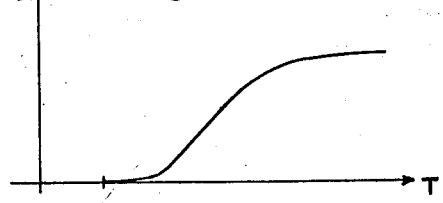

Thus, the curve shown in FIG. 8 will be obtained, this curve beginning on the abscissa at a point corresponding to the time when the switch 7 is closed.

In a modified form of embodiment based on the mounting shown in FIG. 7, a resistor of relatively low value, whether fixed or variable as a function of the control factor contemplated, is interposed between the emitter 18 of transistor 16 and the positive terminal of the source of current 1 as a substitute for the direct connection; with this modified structure it is possible, if desired, to eliminate the temperature compensation through resistor 21, by substituting for this resistor a direct connection or an ordinary resistor. As a matter of fact, in a relatively wide zone of the voltage fed between the base and emitter of transistor 16, the law of current variation in transistor 3 depends mainly on the value of the resistor mounted in series with the emitter 18.

Figure 9:
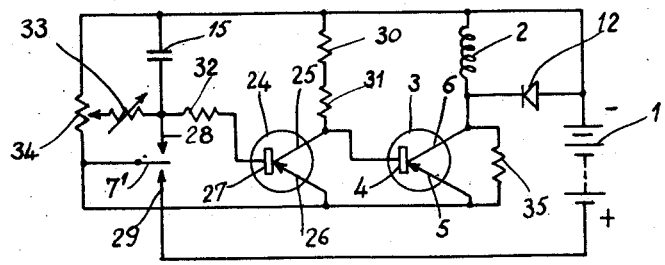

The assembly shown in FIG. 9 comprises a reversing switch of which the movable arm $7^1$ controls the presence or the absence of the current to be controlled, according as it engages the fixed contacts 29 or 28. Thus, when contacts $7^1$ and 29 are spaced from each other, the power circuit of a first transistor 3 is no more supplied with current from the source 1 through the emitter 5 and collector 6. Irrespective of the position of $7^1$, the base 4 is connected to the collector 25 of another transistor 24 on the one hand and to the negative terminal, on the other hand, through a set of resistors 30 and 31 wherein resistor 30, in certain applications, is a resistor having a high positive coefficient of temperature, this resistor consisting if desired and most simply of the filament of an incandescent lamp. The emitter 26 of transistor 24 is also connected to the movable contact $7^1$. The base 27 is connected through resistor 32 to the other fixed contact 28, to one of the armatures of capacitor 15, and, through a variable resistor 33 responsive to one of the control factors, to the slider of a low-value potentiometer 34 which may also be responsive to the control factor, if desired.

A low-value resistor 35 is connected between the emitter 5 and collector 6 of transistor 3. A junction diode 12, so directed that it will not conduct current when the latter flows normally through coil 2, is connected in parallel with this coil 2.

This assembly operates as follows:

When the movable contact $7^1$ engages the fixed contact 28, the capacitor 15 cannot remain charged for if it were so it would be discharged through transistor 3 and resistor 35 into coil 2 and also through resistor 34. Consequently, no appreciable potential difference is applied to the different electrodes of the transistors involved and no current flows through the coil 2. This is the inoperative period.

Figure 10:
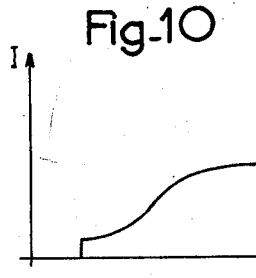
Figure 11:
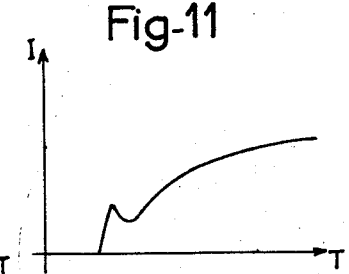

If, in order to cause a gradually increasing current to flow through coil 2, the movable contact $7^1$ is now switched from contact 28 to contact 29, and assuming that capacitor 15 is not charged, a strong bias is applied between the base 27 and emitter 26 through resistor 32, thus causing a relatively strong current to flow through the collector 25; the value of the voltage drop in resistors 30 and 31 is so selected that the biasing of base 4 of transistor 3 will be of the order of the biasing corresponding to the building up of current in the collector of transistor 3. The current available in member 2 would be very low if resistor 35 were not connected across the emitter and collector 5, 6 of transistor 3, thus providing a minimum initial current when the movable contact $7^1$ engages the fixed contact 29. As capacitor 15 becomes gradually charged through resistance 33 and also somewhat through resistor 32 in series with the emitter-base circuit of transistor 24, the biasing of base 27 decreases gradually as well as the current in collector 25. The voltage drop in resistors 30 and 31 decreases, the biasing of base 4 increases as well as the current in collector 6. Under these conditions, and as in the preceding examples, a gradual variation in the current flowing through the member 2 is obtained, this variation being characterized by a quick start until the predetermined value is attained. The resulting curve is shown in FIG. 10. It begins from the abscissa at a point corresponding to the moment when the movable contact $7^1$ engages the fixed contact 29.

If the resistor 30 has a high positive coefficient of temperature, when contact $7^1$ engages contact 29 the capacitor 15 is not charged yet, the current in collector 25 is maximum, and this resistor 30 has no time for warming up and therefore has a low ohmic value, thus causing through the saturation of the base circuit of transistor 24, which is due to the series resistor 32, a voltage drop in resistors 30 and 31 which is not sufficient to absorb the feed voltage. Thus, a substantial bias is applied to the base 4 and consequently a substantial voltage flows through the member 2.

As the resistor 30 warms up, its resistance value increases and the current flowing through member 2 decreases rapidly but increases immediately thereafter due to the charging of capacitor 15.

Thus, a considerable current impulse is available from the onset which may promote the movement of the armatures of an electromagnet toward each other, and nevertheless the torque transmitted will remain within reasonable values upon completion of this movement, since the current has dropped meanwhile to a low value before rising again. This is shown clearly by the diagram of FIG. 11 wherein the curve origin lies on the abscissa at a point corresponding to the time when the movable contact $7^1$ engages the fixed contact 29.

When the movable contact $7^1$ moves away from contact 29 and engages the opposite contact 28, the current flowing in member 2 disappears very rapidly if the capacity of capacitor 15 is not too high. The diode 12 protects the transistor against the induced current caused by the current cut-off in coil 2.

In an alternate form of embodiment (not shown) the potentiometer 34 and resistor 33 may be dispensed with and similar results may be obtained as the capacitor is charged through the transistor 24. In this case, the base resistor 32 will be variable and responsive to the control factors.

The mounting illustrated in FIG. 12 provides with the desirable safety and reliability conditions at the same time a variation in the speed with which the current is built up, a modification in the law of variation and a limitation in the maximum current, as well as a substantial current impulse at the start, if necessary, the control factor acting, if desired, only upon a single variable element 36, although this limitation has not been contemplated in the following description. The building up of gradually increasing current is obtained by closing a simple switch 7.

This mounting comprises a source of current 1, a load circuit 2, and the base 4, emitter 5 and collector 6 constituting a power transistor 3. The emitter 5 is connected to the insulated positive terminal of switch 7 through the medium of a low-value variable resistor 36, preferably of the stepped type. A resistor 35 connects the end of resistor 36 to collector 6. The diode 12 is mounted in parallel on the member 2. The base 4 is connected to the emitter 26 of another transistor 24 having its collector 25 connected through resistor 30 to the negative terminal of the source of current 1. The series and medium-value resistor 37 and capacitor 38 are mounted between the negative terminal of the source of current 1 and the base 4 of transistor 3. These resistor 37 and capacitor 38 are not absolutely necessary, except in a specific case of a current law.

The resistor 32 connects the base 27 to the armature 40 of capacitor 15 connected in turn to the slider of a potentiometer 34 of moderate ohmic value through a variable resistor 33 responsive to the control factor, and also through a diode 41, as shown. The armature 39 is connected to the insulated contact of the positive terminal of switch 7.

This mounting operates as follows:

Assuming that switch 7 is open, that is, in the position contemplated for suppressing the current from coil 2, the armature 39 of capacitor 15 which is connected to the insulated contact of switch 7 is brought to the same potential as the negative terminal of the source of current 1 through resistor 35 and transistor 3 mounted in series with the load member 2. As the circuit of emitter 5 is open, no appreciable current will flow through the coil 2.

The operation of this mounting will now be described from the period in which the current is caused to appear and assuming that the resistor 37 and capacitor 38 are disconnected.

As the switch 7 is closed to cause current to appear in the member 2, the armature 39 of capacitor 15 which was hitherto connected to the negative terminal will be connected to the positive terminal of source 1, thus causing current to flow through resistor 33 which, at the time the switch is closed, raises the potential of armature 40 and therefore of base 27 to a highly positive value such that no appreciable current will flow through the emitter-to-collector circuit of transistor 24. Thus, no biasing is applied between the base 4 and emitter 5 of transistor 3, and only a very low current flows through the circuit 5, 6 of the transistor immediately after the switch 7 has been closed. The resistor 35 supplies the member 2 directly and provides a minimum initial current.

As the capacitor becomes gradually charged, the voltage drop in resistor 33 decreases. A gradually increasing biasing voltage of adequate direction is fed by resistor 32 to a point lying between the base 27 and emitter 26 of transistor 24, the emitter current from 26 and base current from 4 increasing in this case together with the current from collector 6 of transistor 3 through coil 2, which is the desired result. The junction 4, 5 of transistor 3 constitutes a charging resistance to transistor 24. Resistor 36 causes a voltage drop to take place which counteracts the variation in the potential of the base 4 in relation to the emitter 5. The law of current variation in member 2 as a function of time depends inter alia on the ohmic value of resistor 36 as well as on the value of resistor 33 and on the adjustment of potentiometer 34.

The main function of resistor 30 is to reduce the thermal dissipation on the collector 25.

When the switch 7 is open to cause the current to disappear from the member 2, the circuit 37, 38 being connected or not, the capacitor 15 will tend, according to the adjustment of 34, to become discharged or to take a moderate charge opposite to the former one through resistors 35, 36 and transistor 3 in series with coil 2, on the one hand, and through the potentiometer 34 and diode 41 shunting resistor 33, on the other hand. When these conditions are obtained (very rapidly) no current circulates through the coil 2. Thus the initial conditions of operation are restored.

The absence of the diode 41 would retard the disappearance of current from member 2 when opening the switch 7, as the discharge current from capacitor 15 must pass through resistor 35. The diode 12 will thus protect the transistor 3 against the current induced when breaking the circuit.

Now assuming that the resistor 37 and capacitor 38 are inserted in the circuit, the capacitor 38 will be discharged when opening the switch 7. When the latter is re-closed, this capacitor 38 will tend to become charged through the junction 4, 5 on the one hand and resistor 37 on the other hand. As a result, there is a current pulse flowing through the base 4 and consequently a current impulse flows through the collector 6 until capacitor 38 has been charged completely, this arrangement being advantageous, notably in the case illustrated in FIG. 9, for attracting the armatures of an electromagnetic clutch.

FIGURE 13 illustrates the typical curves obtained with the mounting of FIG. 12 at different ohmic values of resistor 36. The thick-line curve shows the variation obtained when the ohmic value of resistor 36 is zero and the dashed lines shows the variation obtained when this value departs from zero, assuming that resistor 37 and capacitor 38 are not inserted in the circuit. The dotted line shows the initial current strength. The curve begins on the abscissa and corresponds to the time when the switch 7 is closed.

As shown, in this case the maximum current is lower, as resistor 36 is connected in series and produces a voltage drop subordinate to the control factor. This arrangement may be advantageous for saving current and smoothing down the engagement of a clutch when the engine is not strongly accelerated.

FIGURE 14 shows the curve obtained with the mounting of FIG. 12 incorporating the resistor 37 and capacitor 38, thus providing a current pulse when closing the switch 7.

In other possible modifications not shown in the drawings the diode 12 may be dispensed with, as well as, in many cases, the potentiometer 34; in this case the resistor 33 and diode 41 are connected directly between the armature 40 and the negative terminal of the source of current 1.

Another modification not shown in FIG. 12 makes it possible, by using a multi-contact switch for causing the variation in the resistor 36, to avoid any progressiveness and any voltage drop in transistor 3 by connecting the last contact stud corresponding to the maximum engine acceleration directly to the collector 6, the movable contact of the switch being connected in this case to the insulated contact of the positive terminal of switch 7.

The mounting illustrated in FIG. 15 is a modified form of the circuitry shown in FIG. 12 which permits either the use of a low-value capacitor 15 or the obtaining of a long-duration progressiveness, for example of the order of ten seconds or more. This result is obtained by using a transistor 42 providing an additional gain in current, this transistor being inserted between the aforesaid transistor 24 and capacitor 15.

On the other hand, the function of the diode 41 of FIG. 12 which consists in permitting a quick current cut-off is devolved on an additional contact 28 of switch 7 which will thus become the reversing switch $7^1$. This last-mentioned modification may be deemed necessary for reasons of cost price. In this mounting, a gradually increasing current is built up when the movable arm $7^1$ engages contact 29.

The elements 37 and 38 of FIG. 12 have been eliminated, but if a current pulse is necessary they can be connected either between the collector 25 of transistor 24 and the negative terminal of the source of current 1, or between the collector 43 of transistor 42 and the source of current 1.

The mounting will now be described more in detail upstream of the transistor 24 of which the base 27 is connected to the emitter 44 of transistor 42 the collector 43 of which is connected to the negative terminal of the source of current 1 through a resistor 31. The emitter 44 is thus connected through transistors 24 and 3 to contact 29 to which resistors 35 and 36 as well as the transistor 3 are also connected. The base 45 is connected to capacitor 15 through a resistor 32 and to the negative terminal through a resistor 46 of relatively high value.

The other armature of capacitor 15 leads to the negative terminal, a variable resistor 33 responsive to the control factor being mounted in parallel across the terminals of this capacitor 15 which is thus connected to the terminals of the source of current 1 through the low ohmic value protection resistor 47 when the movable arm of the reversing switch $7^1$ is moved from contact 29 to contact 28.

This arrangement operates as follows:

When the movable arm $7^1$ engages the contact 28, capacitor 15 becomes charged up through resistor 47 to a value approximating that of source 1, but no current flows through the circuit of coil 2 since contact $7^1$ is separated from contact 29.

To ensure the gradual building up of current in the load or control member 2, the arm $7^1$ is caused to engage this contact 29, and at this time the current is fed through resistor 35 directly to member 2, thus providing a minimum starting value. On the other hand, the previously charged capacitor 15 begins to discharge itself through resistor 33 responsive to the control factors, and on the other hand into the transistor circuit through resistor 32. Consequently, a voltage difference appears between the base 45 and emitter 44 which, after the current amplification effected by the transistor 24, causes the circulation of a gradually increasing current from the collector of transistor 3 and, therefore, through the load or controlled member 2, which is the desired result.

The main purpose of the resistors 30 and 31 inserted respectively in the collector circuits of transistors 24 and 19, is to reduce the dissipation of heat on the collectors of these transistors.

The transistors now in current use have a threshold value at which the collector-emitter current builds up for controlling by means of a base voltage, and the value of this threshold depends on the temperature; now in the mounting illustrated in FIG. 15 the threshold values of the three transistors are added to one another and in this case it would be necessary to allow a certain time period to elapse subsequent to the actuation of the movable arm $7^1$ before the discharge of capacitor 15 is sufficient to build up, between the base 45 and the positive terminal, the voltage necessary for overstepping this threshold.

In this case, the curve shown in FIG. 16 would be obtained. The point on the abscissa where this curve begins corresponds to the moment in which the movable contact arm $7^1$ engages the fixed contact 29. The inconvenience set forth hereinabove may be avoided, if desired, by providing a resistor 46 acting as a voltage divider with resistor 32. Thus, even when the capacitor 15 is charged at the voltage of the current source 1, the voltage fed to the base 45 corresponds to the origin of the characteristic.

The resistors 32 and 46 may consist preferably of materials responsive to the ambient temperature so as to partially compensate the influence of temperature on the transistors. Thus, the reference numeral 32 may designate a resistor or a set of resistors having a negative coefficient of temperature.

Thus, gradual increases in the current values are obtained which are illustrated in the diagram of FIG. 17.

In all the mountings described hereinabove, and according to modifications not shown in the drawings, the member in which the current is to vary gradually may be inserted in the emitter circuit instead of the collector circuit of the power transistor, the current forms and the progressiveness time obtained in this case departing definitely from those resulting from the preceding arrangements. In this case the law of current variation is frequently more stable, for the inherent characteristic of the transistor is less effective, the emitter potential following substantially the base potential. This mounting is particularly advantageous when it is desired to leave unaltered or moderately altered the form of variation resulting from the incoming stage.

In many cases it is also advantageous to use simultaneously transistors having different polarities in order to reduce the number of auxiliary elements in the circuits, such as resistors, and the replacement of a switch such as 7 by a transistor junction with a view to provide a purely electronic control may be facilitated by the use of a NPN-type transistor in a mounting utilizing PNP-type transistor, or vice-versa.

Conventional temperature compensation means, even if they are not described in detail in this specification, may be associated either with the base, or with the emitter of one or more transistors whenever this is permitted by the mounting.

Certain resistors may be replaced by voltage-responsive resistors, or resistors capable of exerting a rectifying action with a view to modify the law of current variation.

In special applications it is also possible to insert in series or in parallel with specific elements of the mountings complete circuits known as generators of currents having different forms, such as stepped, triangular, sinusoid signals and the like, which are superposed on the gradual variation in the load current.

In the devices shown in FIGS. 7, 9, 12, 15 the operation of contact 7 or $7^1$ with a view to provide the inoperative condition without any circulation of current through the coil 2 will not cause the immediate disappearance of the current therefrom, for this current will fade out with a certain progressiveness which may constitute an interesting feature in certain cases, notably in automotive vehicles, in the case of electrical clutches, in order to suppress shocks in the transmission when disengaging the clutch.

I claim:

1. A control system for gradual establishment and quick cut off of an electric current for electrical coupling apparatus, particularly for energizing electrical clutches comprising: in combination, a clutch coil; a D.C. source; a transistor having a collector electrode, an emitter electrode and a base electrode, said collector electrode being connected to one terminal of said source through said coil and said emitter electrode being connected to the other terminal of said source; a timing circuit connecting said emitter electrode and base electrode in circuit with the source and including a variable correcting resistor; and means in said timing circuit varying the potential across said correcting resistor as a predetermined function of time, whereby to vary the current flowing through said base electrode.

2. A system as recited in claim 1 wherein said timing circuit comprises a switch and an impedance connected in series between one terminal of said source and said base electrode, said impedance comprising a type that permits a flow of current changing as a predetermined function of time.

3. A system as recited in claim 2 wherein said impedance comprises a resistance having a high coefficient of temperature resulting in the changing of current flow as said predetermined function of time.

4. A system as recited in claim 2 wherein said impedance comprises an inductance.

5. A system as recited in claim 1 wherein said timing circuit includes a second transistor having a collector electrode, an emitter electrode and a base electrode, circuit means connecting said emitter electrode and said base electrode of said second transistor between one terminal of said source and the base electrode of said first mentioned transistor, and wherein said last-named means comprises means to vary as a predetermined function of time the current flowing through the base electrode of said second transistor.

References Cited in the file of this patent

UNITED STATES PATENTS

| | | |
|---|---|---|
| 2,788,104 | Mason | Apr. 9, 1957 |
| 2,831,114 | Van Overbeek | Apr. 15, 1958 |
| 2,850,654 | Jaeschke | Sept. 2, 1958 |
| 2,947,881 | Elliot | Aug. 2, 1960 |
| 2,947,916 | Beck | Aug. 2, 1960 |
| 2,970,227 | Horton | Jan. 31, 1961 |